US008864149B2

(12) United States Patent
Stryker et al.

(10) Patent No.: US 8,864,149 B2
(45) Date of Patent: Oct. 21, 2014

(54) MEDICAL CART

(75) Inventors: Martin W. Stryker, Kalamazoo, MI (US); Cory P. Herbst, Shelbyville, MI (US)

(73) Assignee: Stryker Corporation, Kalamazoo, MI (US)

( * ) Notice: Subject to any disclaimer, the term of this patent is extended or adjusted under 35 U.S.C. 154(b) by 447 days.

(21) Appl. No.: 13/114,360

(22) Filed: May 24, 2011

(65) Prior Publication Data

US 2011/0291372 A1 Dec. 1, 2011

Related U.S. Application Data

(60) Provisional application No. 61/348,035, filed on May 25, 2010.

(51) Int. Cl.
B62B 3/00 (2006.01)
B62B 1/00 (2006.01)
A61G 12/00 (2006.01)
B62B 5/00 (2006.01)

(52) U.S. Cl.
CPC ............ B62B 3/005 (2013.01); B62B 2206/06 (2013.01); B62B 3/008 (2013.01); B62B 5/0033 (2013.01); A61G 12/001 (2013.01)
USPC ...................................... 280/47.35; 280/79.3

(58) Field of Classification Search
USPC ........................ 280/47.35, 47.41, 79.11, 79.3; 180/19.1, 19.2, 19.3
See application file for complete search history.

(56) References Cited

U.S. PATENT DOCUMENTS

| | | | | | |
|---|---|---|---|---|---|
| 2,819,938 | A | * | 1/1958 | Zerver | 280/79.3 |
| 2,830,825 | A | * | 4/1958 | Webber et al. | 280/79.3 |
| 3,215,483 | A | * | 11/1965 | Nelson | 312/249.13 |
| 4,114,965 | A | * | 9/1978 | Oye et al. | 312/209 |
| 4,249,749 | A | * | 2/1981 | Collier | 280/35 |
| 4,466,628 | A | * | 8/1984 | Zerver | 280/47.35 |
| 4,913,453 | A | * | 4/1990 | Wagner et al. | 280/79.2 |
| 5,083,805 | A | * | 1/1992 | Monch et al. | 280/47.35 |
| 5,129,611 | A | * | 7/1992 | Grover et al. | 248/688 |
| 5,558,112 | A | * | 9/1996 | Strieter | 134/103.2 |
| 5,746,282 | A | * | 5/1998 | Fujiwara et al. | 180/6.2 |
| 5,927,745 | A | * | 7/1999 | Cunningham | 280/652 |
| 6,000,486 | A | * | 12/1999 | Romick et al. | 180/23 |
| 6,257,358 | B1 | * | 7/2001 | Roach | 180/19.1 |
| 6,276,471 | B1 | * | 8/2001 | Kratzenberg et al. | 180/19.3 |
| 6,343,665 | B1 | * | 2/2002 | Eberlein et al. | 180/19.1 |
| 6,383,242 | B1 | * | 5/2002 | Rogers et al. | 55/385.2 |
| 6,409,186 | B2 | * | 6/2002 | Bennington | 280/43.23 |
| 6,626,445 | B2 | * | 9/2003 | Murphy et al. | 280/47.34 |
| 7,073,631 | B2 | * | 7/2006 | Ludwig et al. | 187/274 |
| 7,188,636 | B1 | * | 3/2007 | Kanne et al. | 135/142 |
| 7,210,545 | B1 | * | 5/2007 | Waid | 180/65.1 |
| 7,213,822 | B1 | * | 5/2007 | Webster | 280/79.3 |
| 7,220,222 | B2 | * | 5/2007 | Springston et al. | 483/28 |

(Continued)

Primary Examiner — J. Allen Shriver, II
Assistant Examiner — James M Dolak
(74) Attorney, Agent, or Firm — Warner Norcross & Judd LLP

(57) ABSTRACT

A cart includes a first frame and a second frame supported for vertical movement relative to the first frame between at least one raised position and at least one lowered position. The second frame is adapted to support at least one tray wherein the tray can be moved by the second frame between at least two elevations to facilitate access to or transfer of the tray from the second frame.

13 Claims, 6 Drawing Sheets

(56) References Cited

U.S. PATENT DOCUMENTS

| | | |
|---|---|---|
| 7,562,883 B2 * | 7/2009 | Livengood et al. ......... 280/87.01 |
| 7,562,897 B1 * | 7/2009 | Sherman et al. ............. 280/651 |
| D610,323 S * | 2/2010 | Saladino ....................... D34/17 |
| 8,074,815 B2 * | 12/2011 | Gerstner ....................... 211/193 |
| 8,132,277 B2 * | 3/2012 | Buchanan ......................... 5/627 |
| 8,276,692 B1 * | 10/2012 | Nwaeke ........................ 180/65.1 |
| 2004/0104560 A1 * | 6/2004 | Tedesco ......................... 280/651 |
| 2005/0236940 A1 * | 10/2005 | Rockoff ......................... 312/209 |
| 2007/0018433 A1 * | 1/2007 | Sinnamon et al. ............ 280/651 |

* cited by examiner

MEDICAL CART

CROSS-REFERENCE TO RELATED APPLICATION

This application claims priority from U.S. Pat. application Ser. 61/348,035, filed May 25, 2010, entitled MEDICAL CART, which is incorporated by reference herein in its entirety.

TECHNICAL FIELD AND BACKGROUND OF THE INVENTION

The present invention generally relates to a medical cart and, more particularly, to a cart that can carry trays, such as accessory trays that may be used to transport surgical tools or medical supplies or the like.

SUMMARY OF THE INVENTION

The present invention relates to a cart such as a medical cart, which is suitable for carrying one or more trays, such as surgical trays.

In one form of the invention, the cart includes a first frame, a second frame supported for vertical movement relative to the first frame between at least one raised position and at least one lowered position, and with the second frame adapted to support at least one tray wherein the tray can be moved by the second frame between at least two elevations to facilitate access to or movement of the tray from the second frame.

In one aspect, the first frame forms a cavity, and the second frame is supported for vertical movement in the cavity. Optionally, the second frame includes two or more shelves.

In other aspects, the first frame includes a base and a plurality of upstanding frame members, and a plurality of bearing assemblies supporting the base. Optionally, the base may also include a powered ground engaging bearing, for example a power driven wheel. In addition, the cart optionally includes at least two powered ground engaging bearings.

According to yet other aspects, the second frame includes a top member, with an upper surface for supporting articles on the second frame. Further, the at least one lowered position includes a fully lowered position in the first frame wherein the second frame is fully lowered into the cavity. When fully lowered, the top member forms the upper side of the cart. Optionally, the top member may include a raised perimeter edge that extends around the support surface to form a spill rim.

In further aspects, the first frame includes upper lateral and side members, which form an upper perimeter of the first frame. When fully lowered, the top member is adjacent to or contacts the upper perimeter of the first frame. Further, the top member closes the top side of the first frame when the second frame is lowered to the fully lowered position.

In another form of the invention, the medical cart includes a base with a compartment and a plurality of bearings for supporting the base on a ground surface. A movable frame is supported in the base for movement from a fully lowered position wherein the frame is enclosed in the base and at least one extended position wherein the frame is at least partially extended from the base. Further, the frame is configured for supporting at least one tray and further configured to allow access or removal of the tray from the frame at least when the frame is moved to the raised position.

In one aspect, the frame is movable between a plurality of raised positions relative to the fully lowered position.

In another aspect, the base is configured to allow access to the tray when the frame is at least partially lowered into the cavity.

In any of the above carts, the cart may incorporate one or more devices to clean or sterilize the tray or trays and their contents and/or the inside of the cart itself.

In any of the above carts, the cart may include a power supply for powering accessories or for powering a power driven ground engaging bearing for driving the cart. Optionally, the power supply is adapted for powering one or more non-cart based accessories. For example, the accessories include one or more accessories selected from the group consisting of a light, a heating device, a lavage device, a rechargeable battery, a VAC device, and a surgical tool.

In any of the above carts, the first frame or base includes an access opening on at least two sides, with each of the access openings including at least one corresponding moveable panel for closing the respective access opening.

These and other objects, advantages, purposes, and features of the invention will become more apparent from the study of the following description taken in conjunction with the drawings.

DETAILED DESCRIPTION OF THE PREFERRED EMBODIMENTS

Figure 1:
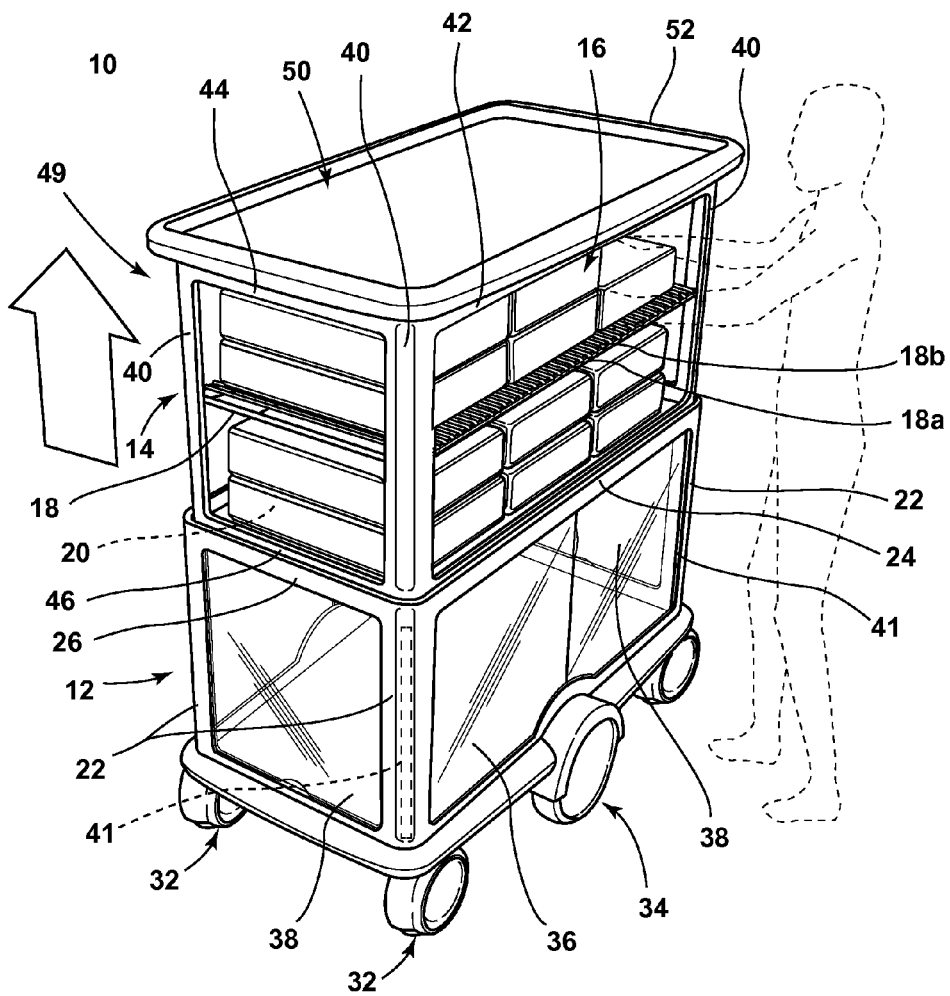
FIG. 1 is a perspective view of one embodiment of the medical cart of the present invention illustrating the cart with a movable shelf system moved to its fully raised position.

Referring to FIG. 1, the numeral 10 generally designates one embodiment of a medical cart according to the present invention. As will be more fully described below, medical cart 10 has a movable shelf that may be configured for supporting one or more trays, such as surgical trays, for example, and which shelf can be moved to a desired height to facilitate handling of the tray or trays. Furthermore, the cart may be configured to provide a compartment in which the movable shelf may be moved and stored for transport. Additionally, the cart's compartment may be configured to clean the tray or trays when in the compartment. The cart itself may also be configured to facilitate cleaning and sterilization so as to not to compromise the cleanliness of, for example, a surgery theater. The cart may also be power driven or may be manually driven, and also may be used to tow one or more carts.

Figure 2:
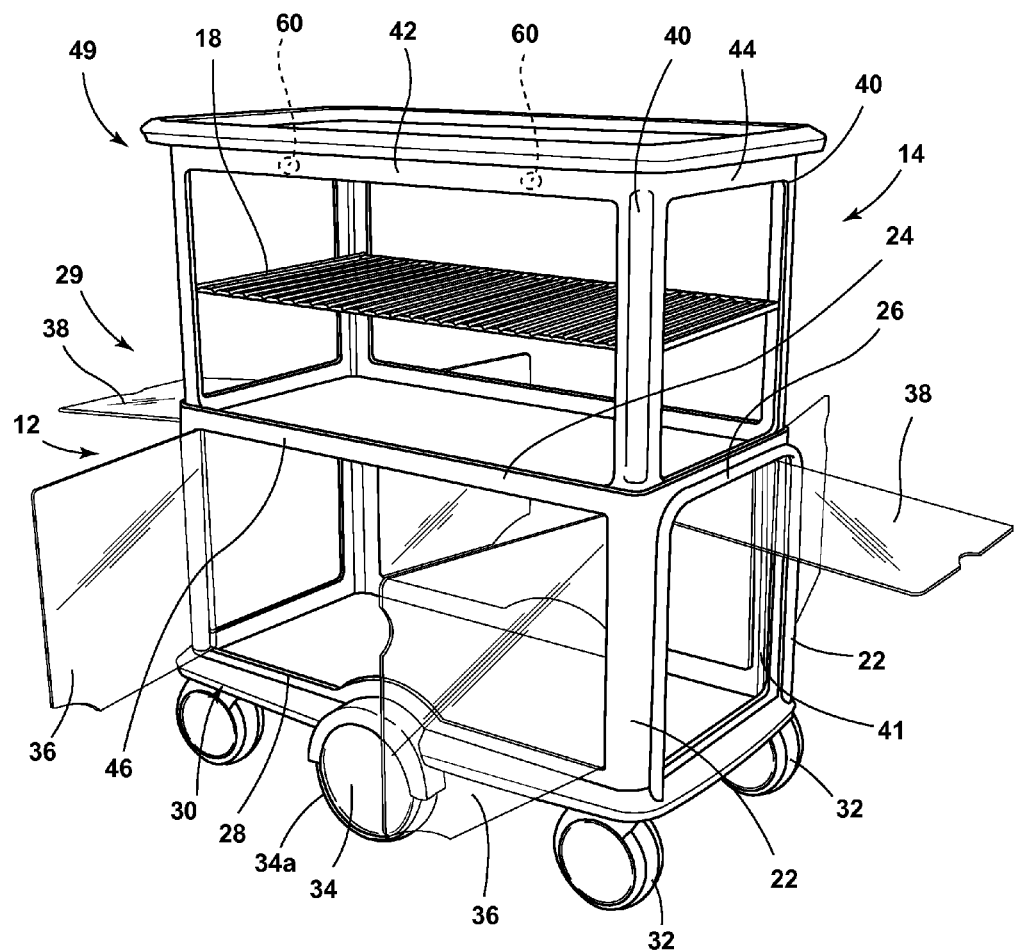
FIG. 2 is a similar view to FIG. 1 with the trays removed and the doors opened for clarity.

Referring again to FIG. 1, and to FIG. 2, medical cart 10 includes a base 12 and a movable shelf assembly 14, which is supported by the base and, further, supported for vertical movement relative to the base so that its shelves 18 may be lowered or raised to provide easier access to items, such as trays 16, supported on the shelves. Further, base 12 is configured so that the shelf assembly 14 can be moved to a stowed position within a compartment in base 12 wherein the shelving assembly 14 is located entirely within the base (such as shown in FIGS. 3 and 4).

As noted, shelving assembly 14 is configured to support one or more trays 16, which are each configured with a bottom wall and side wall to hold accessories, such as surgical tools or accessories or other medical supplies. Trays 16 may be provided in different sizes and, further, modular. For example, two smaller trays may equal the size of a larger, middle size tray so that two small trays can sit on one of the middle size trays. The middle size tray may be half the size of a large tray so that two middle size trays or four small trays may be stacked on the larger tray. In this manner, the trays can accommodate different sized objects or group of objects and conveniently stack together. In this manner, shelves 18, 20 may be sized to hold one large tray or four small trays or two medium trays or a combination of the various sized trays. In the illustrated embodiment, shelving assembly 14 includes two shelves 18 and 20. Further, in the illustrated embodiment, at least shelf 18 comprises a wire frame 18a with a plurality of laterally extending wire frame members 18b that provide a low friction surface to allow the trays to be easily slid off the shelf. Further, as will be more fully described below, given their open frame construction, shelf 18 facilitates the cleaning and sterilization of the cart when the trays are removed. It should be understood, however, that the number of shelves and the style of the shelves may be varied.

Figure 3:
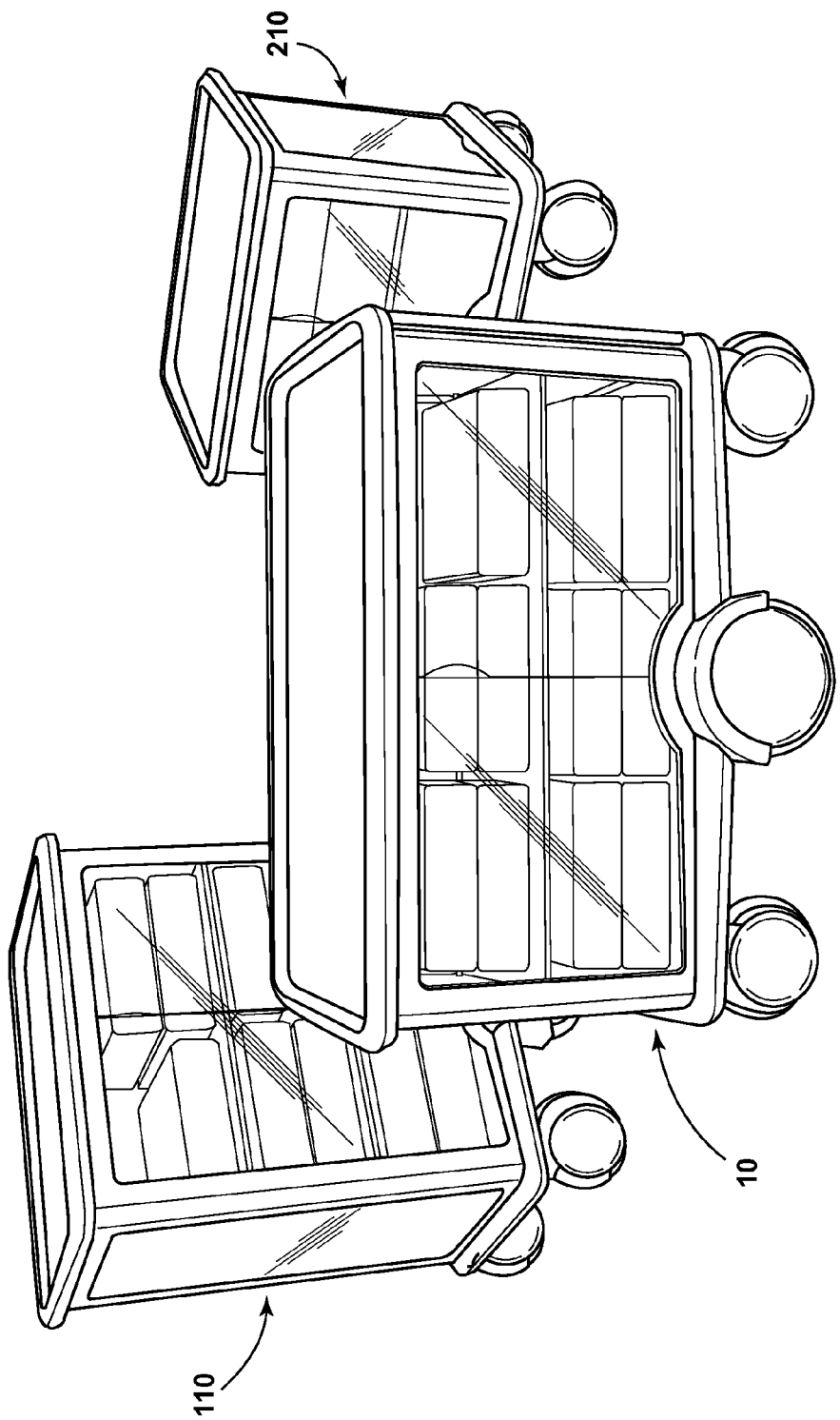
FIG. 3 is a perspective view of a plurality of different embodiments of the cart of the present invention illustrating in the forefront the cart of FIG. 1 and in the rear two non-powered embodiments of the cart.
Figure 4:
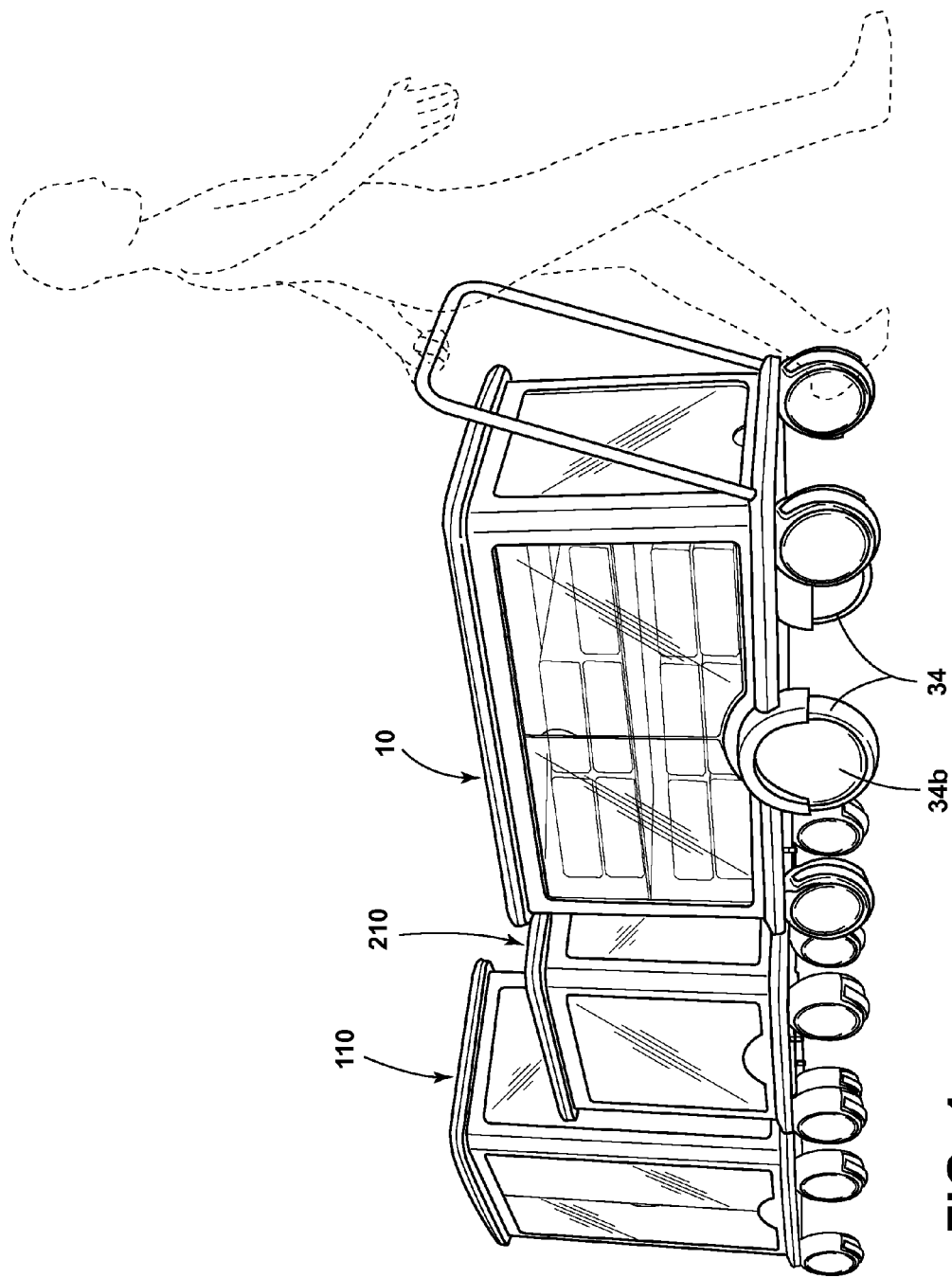
FIG. 4 is a perspective view of the cart of FIG. 1 configured as two carts for the other two carts shown in FIG. 3.
Figure 5:
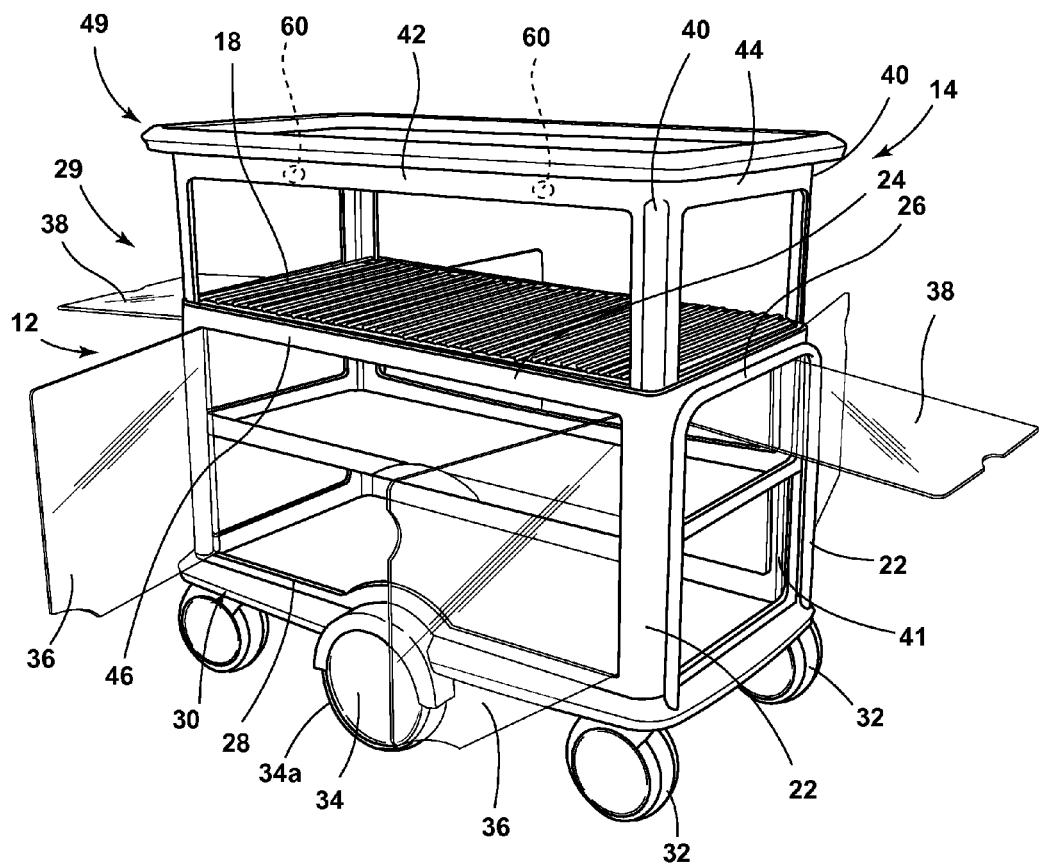
FIG. 5 is a similar view of FIG. 1 with the shelf assembly lowered to an intermediate position.
Figure 6:
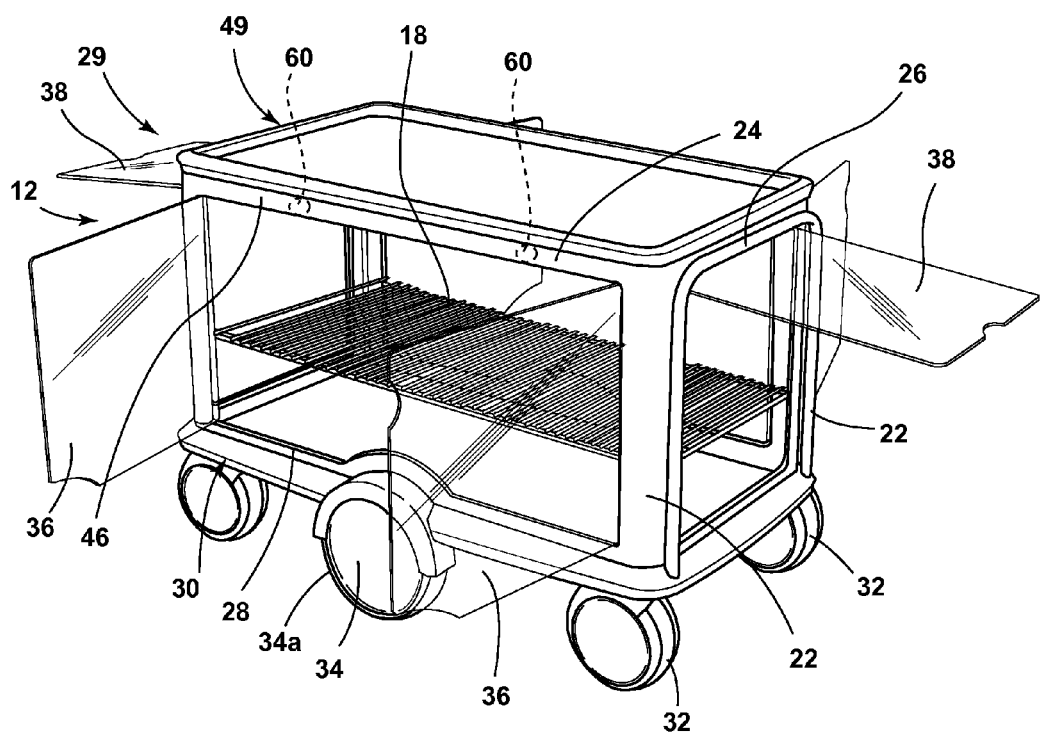
FIG. 6 is a similar view to FIG. 5 with the shelf assembly lowered to its lowermost position.

As noted above, shelving assembly 14 is supported for vertical movement in base 12 so that shelf assembly 14 may be raised or lowered from its fully lowered position in which the shelving assembly is entirely enclosed in base 12, such as shown in FIGS. 3 and 4, and one or more raised positions. For example, shelf assembly 14 may be configured so that it has multiple discrete raised positions or may have infinite positioning between its fully lowered position and its fully raised position. As best seen in FIG. 2, base 12 is formed from a plurality of vertical frame members 22 and lateral and horizontal frame members 24 and 26, with vertical frame members 22 supporting horizontal frame members 24 and 26 on a base frame member 28, which together form a frame 29 for the compartment. Base frame member 28 in turn is supported on a wheeled base 30, which includes a plurality of bearings 32 and, further, one or more optional power driven ground engaging bearings 34.

In the illustrated embodiment, cart 10 includes two driven ground engaging bearings 34, one on each side of the cart and generally in the middle of the side. Driven ground engaging bearings 34 may include wheels 34a, which are driven by a motor mounted, for example, to the underside (not shown) of wheeled base 30. For example of suitable motors and mounting arrangements for the motor and power driven ground engaging bearings 34, reference is made to U.S. patent application Ser. No. 12/577,355, filed Oct. 12, 2009, entitled SPEED CONTROL FOR PATIENT HANDLING DEVICE and to Stryker's ZOOM® drive described in U.S. Pat. No. 6,772,850 (which are commonly assigned to Stryker Corporation of Kalamazoo, Mich., and incorporated by reference herein in their entireties), with the one or more sensors (sensitive to pressure from a user to drive the cart) located at one or more locations around the cart. It should be understood that a single power driven ground engaging bearing may also be used, for example located in the center of the wheeled base 30. Alternately, as described in the copending application, bearings 32 may be powered. Additionally, the driven ground engaging bearing may be pivotally mounted so that is dropped down for engagement with the ground surface but then lifted to a stowed position, such as described in U.S. Pat. Nos. 3,306,116; 6,256,812; 6,725,956; 6,752,224; 6,792,630; and 7,062,805, which are commonly assigned to Stryker Corporation of Kalamazoo, Mich., and incorporated by reference herein in their entireties. As described in reference to the alternate embodiments, described more fully below, the driven ground engaging bearing(s) may also be eliminated so that cart is not power driven.

When powered, cart 10 may also incorporate a platform to allow a user to stand on the platform and ride along with the cart, for example, at the back of the cart. In this embodiment, at least one or more the ZOOM® drive's sensors would be at the back of the cart accessible to the user when standing on the platform. The platform may be fixed or movable between a stowed position and an operative position. For example, the platform may be pivotally mounted to the cart, for example, to base 12.

To form a closed compartment, base 12 optionally includes a plurality of panels 36 and 38, which are mounted to frame 29 and, further, optionally pivotally mounted to the frame to allow the panels to be opened for easy access to the compartment. For example, panels 36 may be mounted for pivotal movement about vertical axes and are located along the lateral sides of the frame 29 to provide doors to the long or lateral side of the base of the cart. Panels 38 may be pivotally mounted about horizontal axes so that the panels may be lifted to also form doors at the forward and rearward ends of the cart to allow access to the compartment, for example, for cleaning. Optionally, panels 36 and 38 are mounted directly to the frame members to further facilitate cleaning of the compartment. Additionally, the panels may be removably mounted to the frame to further facilitate cleaning.

As previously noted, shelf assembly 14 is mounted for vertical movement in base 12. Shelf assembly 14 is also formed from a plurality of vertical frame members 40 and lateral and end transverse frame members 42, 44, which are supported on vertical frame members 40. Frame members 40 are in turn supported by a base frame 46, which together with frame members 42, 44 form a frame 49 for shelf assembly 14. The shelves 18 are then supported by the frame and by vertical frame members 40 and, further, are contained within the footprint of frame 49. The footprint of shelf assembly 14 is also within the footprint of frame 29 of base 12 so that shelf assembly 14 may be moved up and down within the outer perimeter of base 12 and through the upper perimeter of frame 29 formed by horizontal frame members 24 and 26.

To raise or lower shelf assembly 14, cart 10 includes one or more lifting or lift assist devices 41. For example, at least two or more of the vertical frame members 40 are guided along the respective vertical frame members 22 of base 12 on guides or tracks formed on the inwardly facing sides of vertical frame members 22 and the one or more lifting devices or lift assist devices are mounted in the compartment, for example in the vertical frame members 22. For example, suitable lift assist devices may include a spring that reduces the amount of force needed to manually raise shelf assembly, a cylinder, such as a Hydro-Lift®-type cylinder that uses a gas spring or a hydraulic cylinder, a cable and pulley system, which allow variable, infinite positioning, or a combination of thereof. For example, with a cable and pulley system, the pulley can be mounted at the top of the first frame, with one end of the cable mounted to the bottom of the second frame, and the other end of the cable extended through a guide and provided with, for example, a handle for pulling the cable and thereby raising the second frame relative to the first frame. Suitable lifting devices also include cylinders, such as Hydro-Lift®-type cylinders, or hydraulic cylinders, acme screw drives, spur gear and rack assemblies, x-frame lifts, or servo-drives, which could be powered by an on-board power supply described below. In this manner, the shelf or shelves may be raised to any height between the shelf assembly's lowermost position and it's fully raised position so that the height of a shelf can be adjusted to suit the user and allows the user to simply slide one or more trays off the cart without requiring the user to lift the shelf. Surgical trays typically weigh about 20 lbs or so when filled with surgical tools, and sometimes more when the contents of one tray is dumped into another tray. For example, when the surgical procedure is over and the clean-up crew is collecting the tools to return them to the location where they are sterilized, the contents of several trays may be dumped into a single tray. Therefore, by reducing the need of the user to lift the tray, the present invention can provide a significant reduction in strain to the user.

Referring again to FIG. 1, the upper side of frame 29 of shelf assembly 14 is optionally closed by another panel 50, which is optionally fixed to frame members 42, 44 to thereby close the upwardly facing side of frame 49 and to form yet another shelf. Panel 50 may be planar to form a support surface for supporting other medical supplies, devices or tools or configured with recesses or receptacles to hold items on the cart. Panel 50 may also include a raised rim 52 to provide a spill shelf, which may be useful when items holding liquid are placed on the panel.

As noted above, cart 10 may include a power supply (not shown). For example, the power supply may be a battery, including a rechargeable battery, for powering the motor that drives the ground engaging bearing. In addition, the battery may be coupled to one or more outlets so that battery may also be used to power tools or other devices or recharge other batteries not on the cart, for example, a lavage device, a pump for a wound care device, such as a vacuum assisted closure (VAC) device, a surgical drill, a light, or a fan for cooling surgical team members incorporated into their clothing or garments, such as disclosed in U.S. Pat. Application Ser. No. 61/253,485, filed Oct. 20, 2009, entitled MICROCLIMATE MANAGEMENT SYSTEM, commonly assigned to Stryker Corporation of Kalamazoo, Mich., and incorporated by reference herein in its entirety. Further, in addition to an electrical power supply, cart 10 may also incorporate a fluid power supply system, such as described in U.S. patent application Ser. No. 12/057,941, filed Mar. 28, 2008, entitled PATIENT SUPPORT WITH UNIVERSAL ENERGY SUPPLY SYSTEM, commonly assigned to Stryker Corporation of Kalamazoo, Mich., and incorporated by reference herein in its entirety, with one or more fluid delivery ports located around the cart for powering, for example, lavage devices, VAC devices and other pneumatically powered devices. Alternately, the cart may omit the on-board power supply (for example in the case of the non-powered drive cart) and simply include electrical outlets for connection to an external power supply so that the external devices may still be powered by way of the cart.

Optionally, cart 10 may incorporate an inductive recharging system for the rechargeable battery, such as disclosed in U.S. patent application Ser. No. 12/145,037, filed Jun. 24, 2008, entitled POWERED PATIENT SUPPORT AND FASTENING SYSTEM WITH INDUCTIVE BASED POWER SYSTEM, commonly assigned to Stryker Corporation of Kalamazoo, Mich., and incorporated by reference herein in its entirety, with the receiving coil located in the cart and the transmitting coil located at a cart storage location, for example. It should be understood that a capacitor may also be used in lieu of the battery if simply powering low power devices, for example electronic devices, including LEDs, such as the UV LEDs, noted below.

As noted above, cart 10 is particularly suitable for transporting surgical trays and for use as a "case cart". Surgical trays hold surgical tools and devices that have to be sterilized before use. These types of trays are often sterilized in a hospital sterilizing department, typically in the hospital basement. After sterilization, the trays are wrapped in a sterile cloth, and labeled so that each doctor has his/her own set or sets. They are then loaded on to these "case carts", which are then brought to surgery. The trays are then taken off the cart and put onto over-bed tables or specialized tables in the operating room. To further enhance the sterilization process, cart 10 may incorporate UV lights 60, for example, mounted to shelf assembly 14 so that when the carts are loaded with the trays, the UV lights may be actuated to further clean the trays and their contents. UV lights may be conventional incandescent UV lights or may be UV LEDs. The lights, as understood from the above-description, may be powered by the onboard power supply, such the battery, or from a non-onboard electrical supply, such as a conventional electrical outlet.

As noted above, cart 10 is configured so that it can be easily cleaned. Optionally, cart may incorporate one or more heating devices, which may be powered by the onboard power supply, such the battery, or from a non-onboard electrical supply, such as a conventional electrical outlet. The heating devices may be activated, for example, so that it is self-cleaning. Similarly, the UV lights that could be used for sterilizing the trays may also be used to clean the interior of the cart. For example, when the cart is being recharged at its stored location, the UV lights or heating device may be actuated and left on for an extended period of time, for example at night or while not in use.

The various components of the cart may be formed, such as by molding, from suitable plastics, including plastics containing post consumer recyclable material, or from metal tubing that is then molded over with plastic. For example, the various frame members and panels may be formed from plastic, including the panels forming the doors. The door panels may be formed from a clear plastic to provide some visual access to the compartment as well. For example, the frames may be molded as a single component to reduce the number of joints or seams. Alternately, if the frames are formed from a plurality of separate frame members, and joined for example by an adhesive or fasteners, they can be enveloped in a cover or coated with a tough but cleanable coating. The coating may be applied by dipping, spraying, or painting. Further, the components or covers or coatings when assembled may be coated or may have incorporated therein an antibacterial or antimicrobial additive, such as copper, silver, or microban to further enhance the cleanliness of the cart.

The bearings may include a rubber or plastic wheel, while the bearings' mounting brackets and shafts may be formed plastic or metal. To facilitate steering of the cart, each of the bearings 32 are optionally mounted for swivel (and axial rotation) with the drive axis 34b of driven ground engaging bearing 34 being fixed. Though it should be understood that other combinations of fixed and rotational axes may be provided.

Referring to FIGS. 3 and 4, the numerals 110 and 210 refer to alternate embodiments of the cart of the present invention. As best seen in FIG. 4, carts 110 and 210 are of similar construction to cart 10, and therefore reference is made to the above description, but are both non-power driven, though they may still have an on-board power supply for powering the various accessories and devices noted above. Optionally, cart 10 may be configured as a towing cart (as shown in FIG. 4), and carts 110 and 210 may be configured as "trailers" with one having a ball hitch and the other having a tongue and ball socket for engaging the ball hitch. Further to facilitate towing or just movement of any of the carts, the carts may include a handle, which may include the ZOOM drive sensors noted above.

Accordingly, the cart of the present invention facilitates transport and handling of trays, such as surgical trays and as noted may be power driven or may be manually driven. Similarly, the shelf supporting the trays may be power driven or manually driven with a counter balance device to facilitate the manual raising of the trays. Further, the cart may be constructed to facilitate cleaning of the cart to reduce the risk of compromise to the cleanliness of a surgery theater, for example. Optionally, the cart may be adapted to allow a transporter to ride along with the cart and, further, may be adapted to tow other non-powered or other powered carts so that a single transporter may move multiple carts at the same time. Further, as described above, the cart may incorporate cleaning devices, such as heating devices or UV lights, which can clean the various surfaces of the cart, for example, when the movable shelf is moved to its fully retracted position in the base of the cart. The various components forming either all or several of the components forming the cart may be formed from recyclable material, such as post consumer recyclable material to reduce the impact on the environment. Because the design may be modular in nature, the cart can be customized by imply adding or removing shelves to accommodate different size trays or items in the cart.

While several forms of the invention have been shown and described, other changes and modifications will be appreciated by those skilled in the relevant art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are defined as follows:

1. A medical cart comprising:
   a first frame, said first frame forming a compartment and supporting at least one movable panel forming a door movable between a closed position and an open position to provide access into said compartment;
   a second frame supported in said compartment for vertical movement relative to said first frame between at least one raised position and at least one lowered position;
   said second frame having a top panel enclosing a top side of said second frame and a shelf below said top panel to support at least one tray, said second frame movable to raise said shelf and to provide access to said shelf when said second frame is raised to said at least one raised position where said shelf is raised above said first frame and movable to lower said shelf where said second frame is lowered to said at least one lowered position into said compartment defined by said first frame and to provide access to said shelf through said at least one movable panel wherein the tray is accessible and removable from said shelf when said shelf is raised above said first frame or lowered in said compartment and said movable panel is in said open position; and
   a powered ground engaging bearing.

2. The cart according to claim 1, wherein said first frame supports at least two panels movable between closed and open positions.

3. The cart according to claim 2, wherein said second frame includes at least two shelves, each of said shelves adapted to support at least one tray.

4. The cart according to claim 2, wherein said first frame includes a base and a plurality of upstanding frame members, and a plurality of bearing assemblies supporting said base.

5. The cart according to claim 1, wherein said ground engaging bearing comprises a wheel.

6. The cart according to claim 1, wherein said cart includes at least two of said powered ground engaging bearings.

7. The cart according to claim 1, wherein said top panel has an upper support surface for supporting articles on said second frame.

8. The cart according to claim 7, wherein said at least one lowered position includes a fully lowered position in said first frame wherein said second frame is fully lowered into said compartment, and said top panel extending over said first frame to form the upper side of said cart when said second frame is in said fully lowered position.

9. The cart according to claim 7, wherein said top panel includes a raised rim extending around said upper support surface to form a spill shelf.

10. The cart according to claim 8, wherein said first frame includes upper lateral and side members, which form an upper perimeter of said first frame, and said top panel extending over said upper perimeter of said first frame to thereby enclose said compartment when said second frame is lowered in said fully lowered position.

11. The cart according to claim 7, wherein said first frame includes a top side, and said top panel closes the top side of said first frame when said second frame is lowered to said fully lowered position.

12. The cart according to claim 1, wherein said first frame supports a plurality of said movable panels for selectively opening or closing said compartment.

13. The medical cart according to claim 1, wherein said second frame support at least one UV light for cleaning items supported in said cart.

* * * * *